United States Patent
Bauer et al.

(10) Patent No.: US 9,325,789 B2
(45) Date of Patent: Apr. 26, 2016

(54) DISTRIBUTED SERVER ELECTION WITH IMPERFECT CLOCK SYNCHRONIZATION

(75) Inventors: Daniel N. Bauer, Birmensdorf (CH); Luis Garcés-Erice, Zurich (CH); Urs Hunkeler, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 12/372,048

(22) Filed: Feb. 17, 2009

(65) Prior Publication Data

US 2010/0211696 A1 Aug. 19, 2010

(51) Int. Cl.
| | |
|---|---|
| G06F 15/16 | (2006.01) |
| H04L 29/08 | (2006.01) |
| G06Q 10/06 | (2012.01) |
| H04L 29/06 | (2006.01) |
| H04L 12/24 | (2006.01) |

(52) U.S. Cl.
CPC .......... H04L 67/1095 (2013.01); G06Q 10/06 (2013.01); H04L 41/0886 (2013.01); H04L 63/10 (2013.01)

(58) Field of Classification Search
USPC ......................................................... 709/201
See application file for complete search history.

(56) References Cited

U.S. PATENT DOCUMENTS

| | | | |
|---|---|---|---|
| 6,973,499 B1* | 12/2005 | Peden et al. .................. | 709/229 |
| 2003/0065761 A1* | 4/2003 | Cereja et al. .................. | 709/223 |
| 2004/0039800 A1* | 2/2004 | Black et al. .................... | 709/220 |
| 2004/0133622 A1* | 7/2004 | Clubb et al. .................. | 709/200 |
| 2006/0242327 A1* | 10/2006 | Knight et al. .................. | 709/248 |
| 2007/0192329 A1* | 8/2007 | Croft et al. ...................... | 707/10 |
| 2007/0298812 A1* | 12/2007 | Singh et al. ............... | 455/456.1 |
| 2008/0010284 A1* | 1/2008 | Beck ................................. | 707/8 |
| 2008/0126445 A1* | 5/2008 | Michelman ................... | 707/204 |
| 2009/0037525 A1* | 2/2009 | Asahara ........................ | 709/203 |
| 2009/0043529 A1* | 2/2009 | Chen et al. ..................... | 702/125 |
| 2009/0086625 A1* | 4/2009 | Nandagopal et al. ......... | 370/227 |

* cited by examiner

*Primary Examiner* — Richard G Keehn
(74) *Attorney, Agent, or Firm* — Scully, Scott, Murphy & Presser, P.C.; Daniel P. Morris, Esq.

(57) ABSTRACT

Embodiments of the invention provide a method, system, and computer program product for selecting a server as a selected server for performing a specified function in a distributed computing system. In one embodiment, the method comprises identifying a group of servers in the system; and choosing as the selected server the server that has been in the system the longest. In one embodiment, each of the servers in the group has a respective contention period, during which the server sends a contention message, and the selected server is chosen using these contention messages. The servers in the group may have imperfect clock synchronization. In this case, the contention periods of the servers is kept greater than the maximum difference between the server clocks. The invention may be used to select a name server, or to select a server for another service.

15 Claims, 5 Drawing Sheets

NAME SERVICE QUERY AND MAP DISTRUBUTION

DISTRIBUTED SERVER ELECTION WITH IMPERFECT CLOCK SYNCHRONIZATION

BACKGROUND OF THE INVENTION

1. Field of the Invention

The present invention generally relates to distributed computer systems, and more specifically, to a distributed computer system in which one of the servers of the system is elected to perform a specified service.

2. Background Art

Distributed Computing Systems are complex aggregations of multiple units that communicate with each other through an interconnect in order to achieve some common goal. To do so, different units in such a system may perform different roles by providing different services to each other. This allows for the distribution of work over many units instead of a single one as in a centralized system, making workloads that a single machine could not possibly sustain feasible. However, given an equal chance of failure of any unit in the distributed system, the chance that any of the units fails, and with it the possibility of accomplishing the goal of the system, is greater in the distributed system than in the centralized system, and increasingly so with the number of units (and services). Different techniques exist to counter this possibility. The two main techniques are: 1) Replicating the same service on a number of units, thus coordinating these units such that the service offered is coherent independently of the unit used to access the service; and 2) Electing a unit to offer a service, monitoring its status, and electing a new one when the first one fails.

One important service in a distributed system is a naming service, which maps human-readable names for objects in the system to more compact, machine-readable identifiers. When two entities in the distributed system are of the same type, they should have the same name, but different from that of other types of entities, such that they can be unequivocally accessed by applications. The simplest way to achieve this is by having one single unit (called the name server) providing the naming service and thus mapping identifiers to names. This excludes any conflict in assigning names to identifiers, provided that all units request the mappings from the same name server. Which unit is actually in charge of providing the service is decided through an election process. When the unit providing the naming service fails, the remaining units go again through the election process to choose a new name server.

A unit offering the naming service stores the mapping of identifiers to names, but this information may be lost if the unit tails to continue operation. A newly elected name server may not know the whole state of the name-to-identifier mapping. In this situation, there is the risk that a request for a mapping is received that is not known to the new name server, and a new mapping is created for that identifier, with the end result of entities of the same type being named differently. A name server may replicate the mapping in all other units, updating them each time a new mapping is done. However, a newly elected server should make sure that it knows all the mappings in the network, having to check with all other units and retrieving any missing mappings. Clearly, the longer a unit has been in the system, the more likely it is that it has collected all updates from the previous name server, and thus the less information it has to retrieve from other units. Therefore the election process should ideally select the oldest unit.

SUMMARY OF THE INVENTION

Embodiments of the invention provide a method, system, and computer program product for selecting a server as a selected server for performing a specified function in a distributed computing system. In one embodiment, the method comprises identifying a group of servers in the system; and choosing as the selected server for performing the specified function, the one server of said group of servers that has been in the system the longest.

In one embodiment, the choosing includes said group of servers choosing the selected server, and all of the servers in said group of servers refer to the selected server to perform the specified functions. In one embodiment, each of the servers in said group of servers has a respective contention period during which said each server contends to be selected as the name server. In one embodiment, each of the servers in said group of servers sends to the other servers in said group a contention message during the contention period of said each server, and the choosing includes using the contention messages from the servers to choose the selected server. In one embodiment, each of the servers in said group of servers has a respective clock for keeping time, the time difference between the clocks of the servers in said group of servers is less than $\Delta t$, and the contention periods of the servers is greater than $\Delta t$.

In one embodiment, each contention message includes a time value, and the using includes using the time values in the contention messages from the servers to choose the selected server. In one embodiment, each of the time values identifies an absolute time, and the using the time values includes choosing as the selected server, the server whose contention message has the earliest absolute time.

One embodiment of the invention, described below in detail, provides a mechanism for electing a server as a selected server for performing a specified function in a distributed computing system with imperfect clock synchronization. This mechanism elects as the selected server, the unit that has been in the system the longest, such that the transfer of state to the new selected server is minimized.

In the distributed system in which this election process is used, either the clocks of the different units in the distributed system are imperfectly synchronized by some external mechanism like Network Time protocol (NTP), or the drift of the clocks has a known upper-bound. In any case, the difference between the actual time and that given by the individual clocks is never greater than some known time $\Delta T$.

As an example, this invention may be used to elect a name server in a distributed computing system, where the computing name server is used to map names for objects in the computing system to machine-readable identifiers. However, embodiments of the invention can be used to elect a unit for any service or protocol that needs a master to operate, which all the units in the system refer to. Embodiments of the invention provide a mechanism to elect said master.

DETAILED DESCRIPTION OF THE PREFERRED EMBODIMENTS

Figure 1:
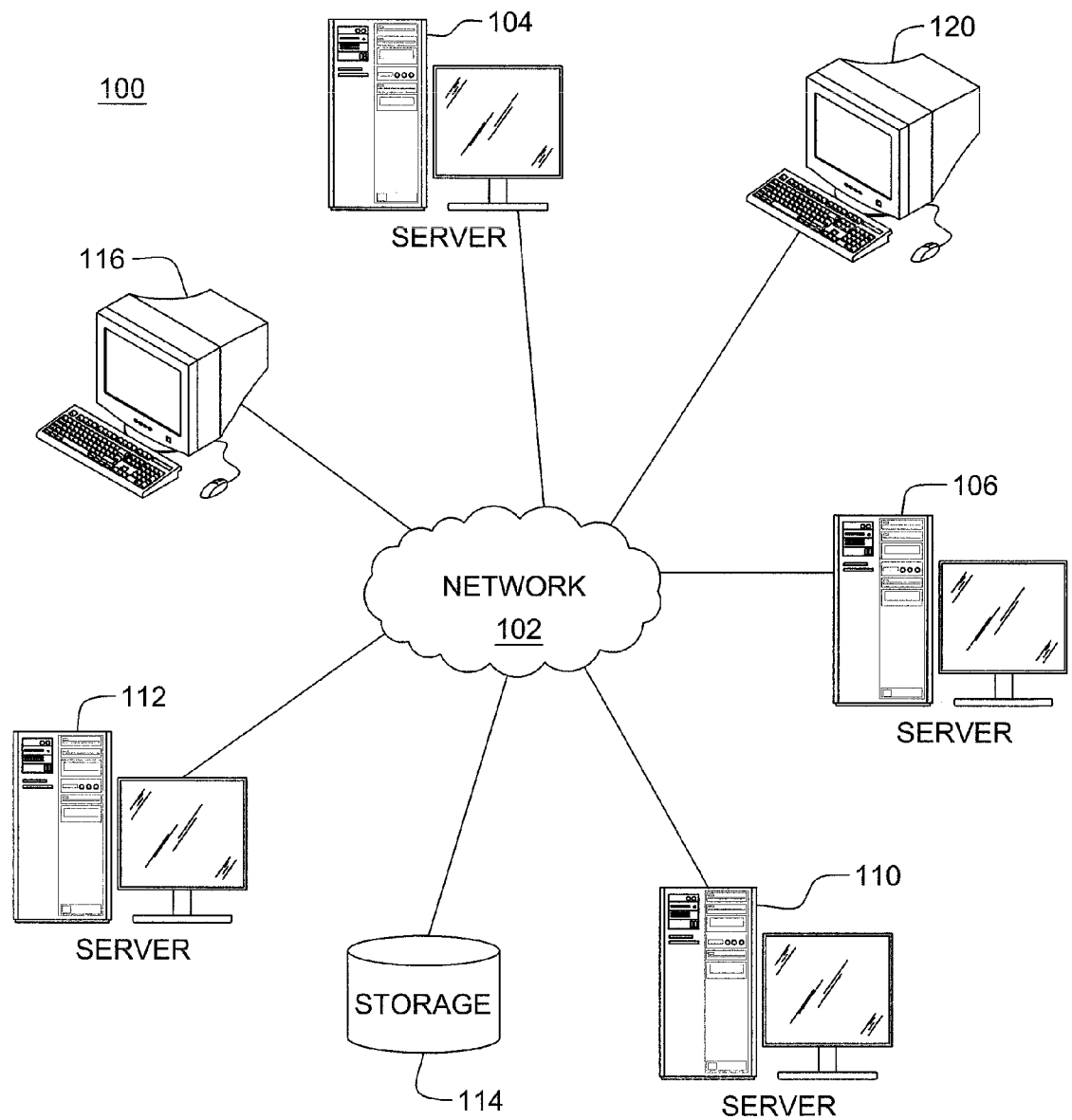
FIG. 1 depicts a representation of a network of data processing systems in which the present invention may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, FIG. 1 depicts a pictorial representation of a distributed computing system 100 in which the present invention may be implemented. System 100 includes a network 102, which is the medium used to provide communications links between various devices and computers connected together within system 100. Network 102 may include connections, such as wire, wireless communication links, or fiber optic cables.

In the depicted example, servers 104, 106, 110 and 112 are connected to network 102 along with storage unit 114. In addition, clients 116 and 120 are connected to network 102. These clients 116 and 120 may be, for example, personal computers or network computers. In the depicted example, servers 104, 106, 110 and 112 provide data, such as boot files, operating system images, and applications to clients 116 and 120.

Distributed system 100 may include additional servers, clients, and other devices not shown. In the depicted example, network 102 may be the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprised of thousands of commercial, government, educational and other computer systems that route data and messages. Of course, system 100 also may be implemented as a number of different types of networks, such as for example, an intranet, a local area network (LAN), or a wide area network (WAN). FIG. 1 is intended as an example, and not as an architectural limitation for the present invention.

As mentioned above, different units in a distributed computing system may perform different roles by providing different services to each other. Embodiments of the present invention provide a method, system and computer program product for selecting a server as a selected server for performing a specified function in a distributed computing system. As an example, one important service in a distributed system is a naming service, which maps names for objects in the system to more compact, machine-readable identifiers. A relatively simple way to ensure consistent use of names is to have one unit, called the name server, provide the naming service and thus map identifiers to names. Embodiments of the invention provide a mechanism for deciding through an election process the server that is in charge of the naming service.

Figure 2:
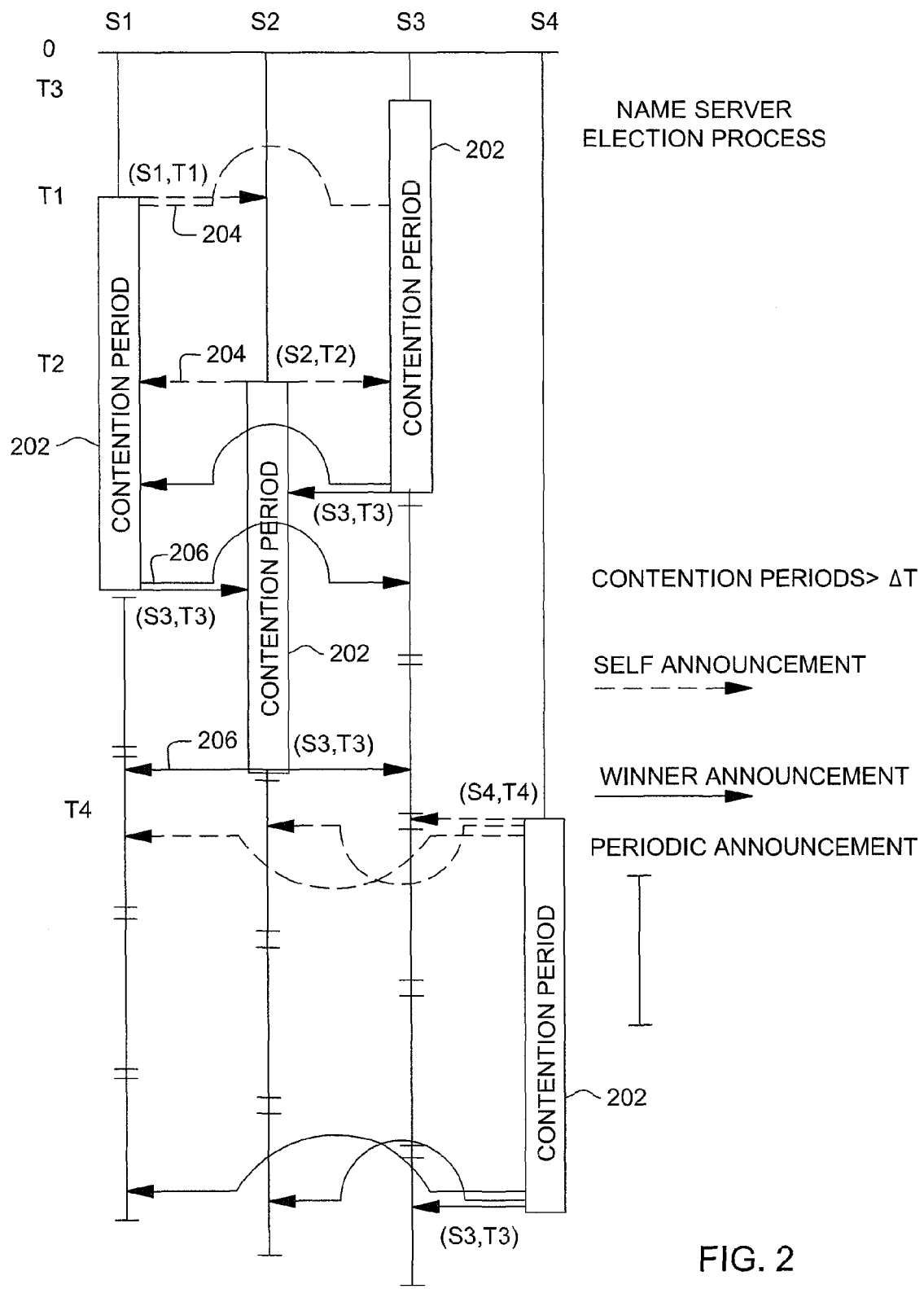
FIG. 2 illustrates a name server election process.
Figure 3:
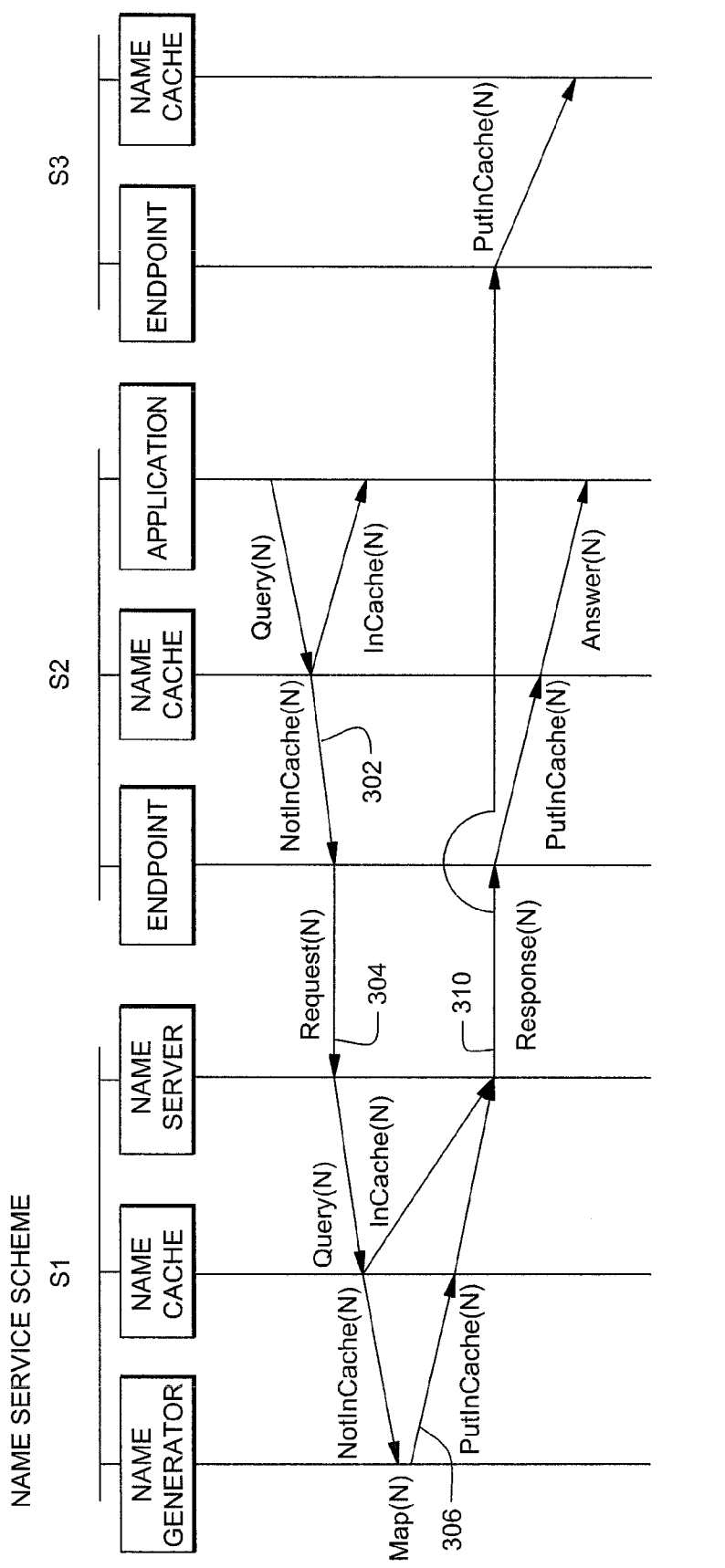
FIG. 3 shows a name service query and map distribution.

In order to reduce the amount of information that a newly elected name server needs in order to perform the naming service, the election process may select as the name server the unit that has been in the distributed system the longest. FIGS. 2 and 3 illustrate an election process that achieves this in a system having imperfect clock synchronization.

In the distributed system in which this election process is used, either the clocks of the different units in the distributed system are imperfectly synchronized by some external mechanism like Network Time protocol (NTP), or the drift of the clocks has a known upper-bound. In any case, the difference between the actual time and that given by the individual clocks is never greater than some known time ΔT.

As shown in FIG. 2, when the system starts, a number of units (S1, S2, S3 in this case) attempt to become the name server. Every unit goes through a contention period 202, which is longer than ΔT. Every unit sends to all the other units through the broadcast medium a message (challenge) 204 containing the absolute time when that unit decided to become a name server (in the form of a timestamp T1, T2, T3), and an identifier for the unit (S1, S2, S3). Each unit participating in the election process receives the challenges of those arriving later. The unit with the lowest timestamp is elected the name server. Every unit proclaims this by, as represented at 206, sending the challenge of the winner at the end of their contention period. This process can be repeated a number of times to account for possible losses in the broadcast medium, which otherwise would distort the perception of the participants set. The winner challenge is resent periodically. Note that when the system starts, it does not matter who did actually decide first to become the name server, as the units contain no state yet.

Later in the example, when a fourth unit (S4) joins the system and attempts to become the name server, it cannot become the name server as it has not joined early enough and its contention period does not overlap with at least one of the first units. This is guaranteed for any device joining after the election process because the clock drift is bounded by ΔT, and the contention period is longer. This means that the time stamp of the new unit (in this case, the fourth unit) cannot win (i.e., be earlier) than the current name server. This way, new units joining the system do not alter who the name server is, thus increasing the stability of the system. A new unit learns the identity of the name server by listening to the periodically sent winner challenges during its contention period. Again, by having the contention period considerably larger than the announcement period, losses in the broadcast medium can be accounted for, because a new unit has the chance to receive each challenge a number of times during the contention period.

If the name server fails, the election process to select a new name server is repeated using the original time stamps each of the remaining units obtained at the beginning.

By electing the unit that has been in the system for the longest time, the elected name server knows all the current mappings of names in the network. This is achieved as shown in FIG. 3. When a unit at 302 queries the name server in order to map a name to an identifier, first a cache local to the unit is checked. If the mapping is not contained there, the query is sent at 304 to the name server. If the mapping is not present in the name server cache, a new unique mapping is created, stored in the name server cache at 306 and the answer is sent to all units at 310 using the broadcast medium. This way, all units store the mapping in their own local caches. If the name server fails, the next elected name server has necessarily heard of all previous mappings, as it is the oldest unit in the system, thus making recovery very fast, by not having to recover the state from all other units. To account for errors and missing mapping updates, the newly elected server can query the other units for a summary of the contents of their caches, and transfer state only from those units that present differences.

In some cases an administrator may want to have more control over which units can become name servers (e.g., only the most robust units). This can be easily achieved by having only a subset of the units participate in the challenge, while the other units just listen for the result of the election.

The above-described embodiment of the invention addresses the fundamental problem of having a constantly available name service in a responsive environment, such that programmers may use useful names for topics, but constant-length identifiers may be used from transmission in the network, bounding processing and transmission time for messages.

In the example discussed above, the invention is used to elect a name server in a distributed computing system, where the name server is used to map names for objects in the computing system to machine-readable identifiers. However, embodiments of the invention can be used to elect a unit for any service or protocol that needs a master to operate, which all the units in the system refer to. Embodiments of the invention provide a mechanism to elect said master.

Figure 4:
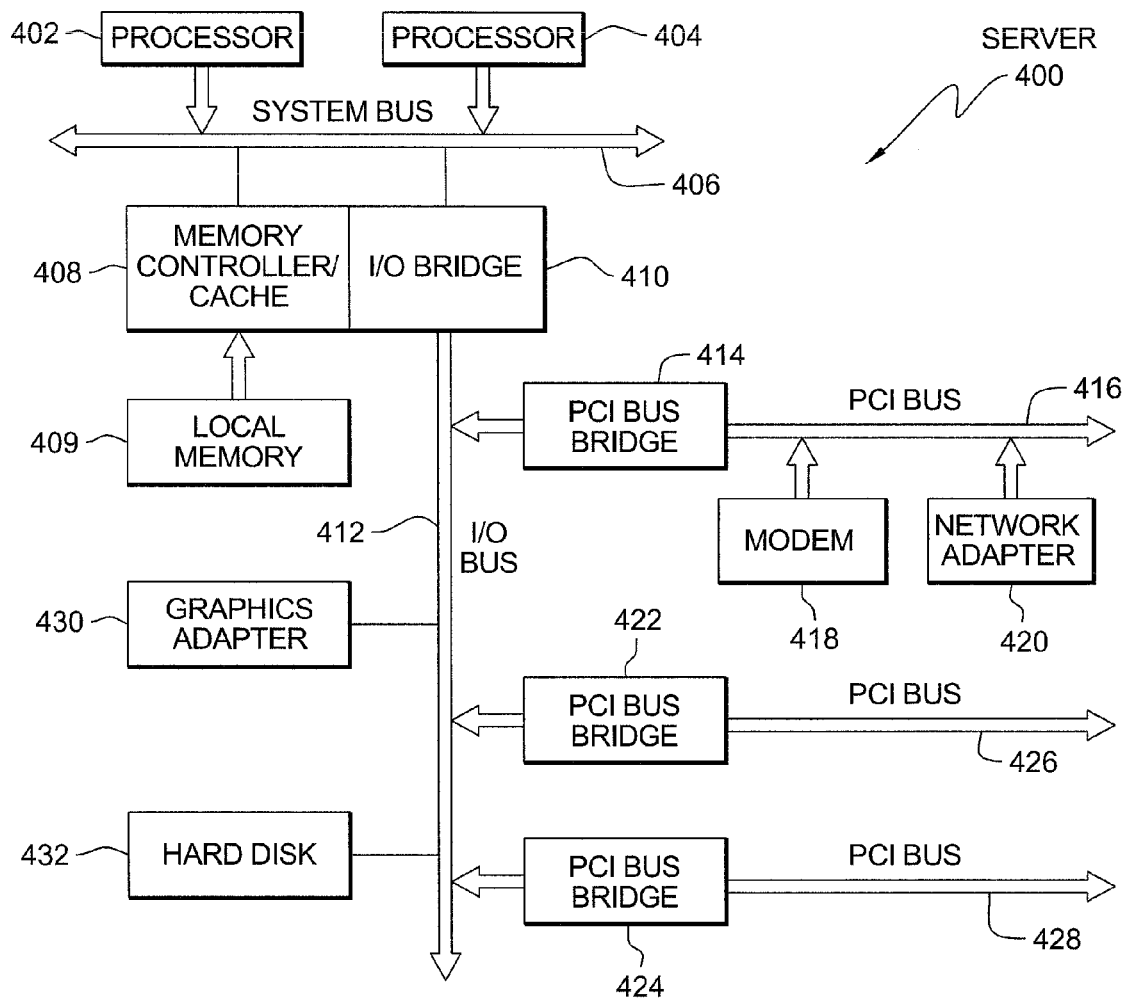
FIG. 4 is a block diagram of a data processing system that may be implemented as a server of the distributed computing system of FIG. 1.

Referring to FIG. 4, a block diagram of a data processing system that may be implemented as a server, such as server 104 in FIG. 1, is depicted. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O Bus Bridge 410 is connected to system bus 406 and provides an interface to I/O bus 412. Memory controller/cache 408 and I/O Bus Bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to clients 116 and 120 in FIG. 1 may be provided through modem 418 and network adapter 420 connected to PCI local bus 416 through add-in connectors.

Additional PCI bus bridges 422 and 424 provide interfaces for additional PCI local buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM eServer pSeries system, a product of International Business Machines Corporation in Armonk, N.Y., running the Advanced Interactive Executive (AIX) operating system or LINUX operating system.

Figure 5:
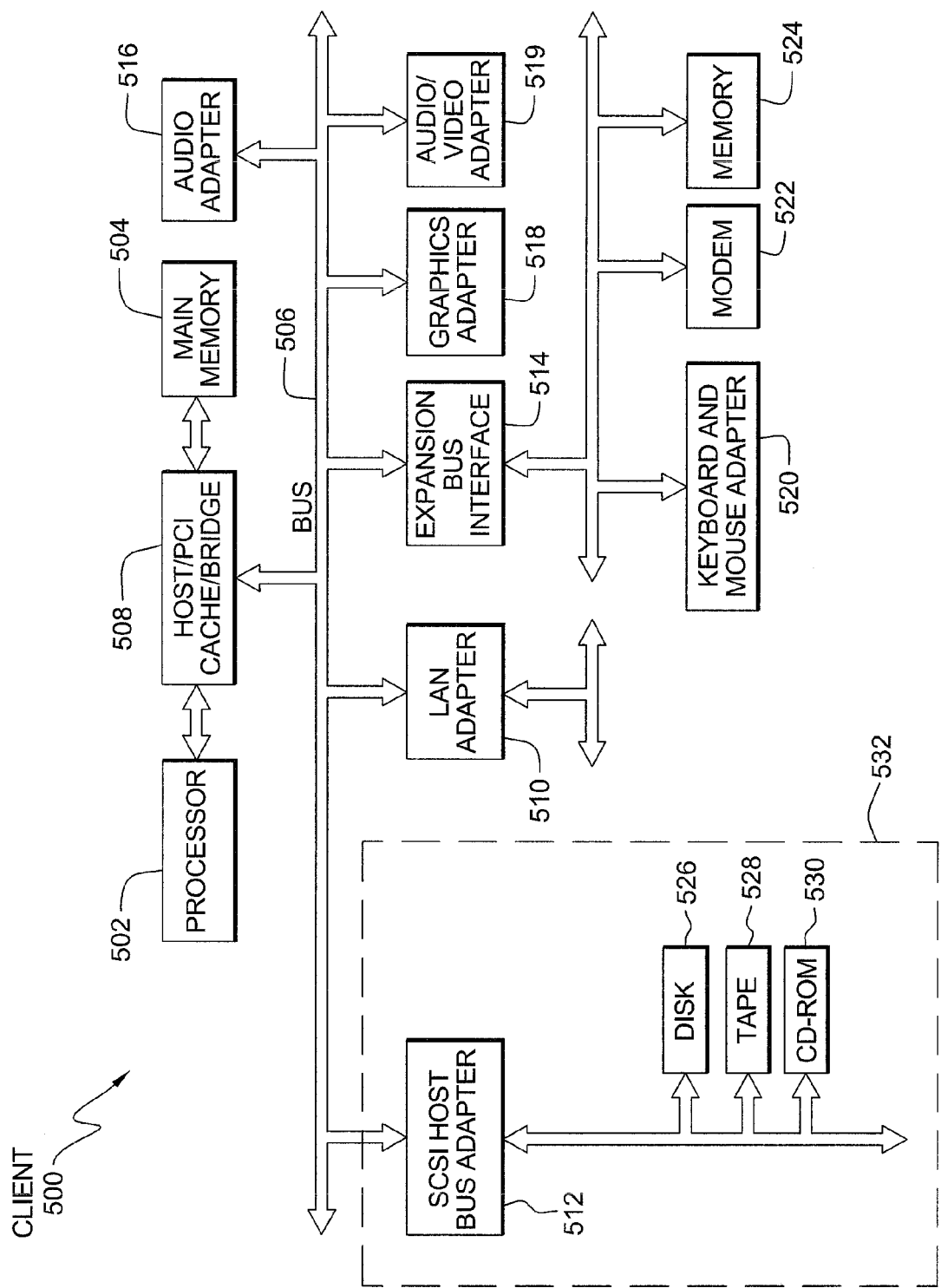
FIG. 5 is a block diagram illustrating a data processing system that may be implemented as a client of the distributed computing system of FIG. 1.

With reference now to FIG. 5, a block diagram illustrating a data processing system is depicted that may be implemented as a client computer in FIG. 1. Data processing system 500 is an example of a client computer. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI Bridge 508. PCI Bridge 508 also may include an integrated memory controller and cache memory for processor 502. Additional connections to PCI local bus 506 may be made through direct component interconnection or through add-in boards. In the depicted example, local area network (LAN) adapter 510, small computer system interface (SCSI) host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. SCSI host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as Windows XP, which is available from Microsoft Corporation. An object oriented programming system such as Java may run in conjunction with the operating system and provide calls to the operating system from Java programs or applications executing on data processing system 500. "Java" is a trademark of Sun Microsystems, Inc. Instructions for the operating system, the object-oriented programming system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 500 may be a stand-alone system configured to be bootable without relying on some type of network communication interfaces As a further example, data processing system 500 may be a personal digital assistant (PDA) device, which is configured with ROM and/or flash ROM in order to provide non-volatile memory for storing operating system files and/or user-generated data.

The depicted example in FIG. 5 and above-described examples are not meant to imply architectural limitations. For example, data processing system 500 also may be a notebook computer or hand held computer in addition to taking the form of a PDA. Data processing system 500 also may be a kiosk or a Web appliance.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of selecting a server as a selected server for performing a specified function in a distributed computing system, the method comprising:
    identifying a group of servers in the system as selecting servers for choosing the selected server;
    each of the selecting servers going through a respective contention period during which said each selecting server contends to be the selected server, including each selecting server in the group sending, during the contention period of said each server, a contention message including a time stamp to all the other selecting servers;
    each of the selecting servers receiving the contention messages from all of the other selecting servers;
    the selecting servers using the time stamps of the contention messages to choose the selected server, including choosing as the selected server for performing the specified function, the one server of the group of selecting servers that has been in the distributed computing system the longest based on the time stamps in the contention messages;
    each of the selecting servers periodically re-sending the contention message of the selected server; and
    the selected server querying other servers in the distributed computing system for specified contents and transferring state only from other servers that present differences; and wherein
    each of the selecting servers in the group has a respective clock for keeping time; and
    for each of the selecting servers, there is a difference between the clock of said each selecting server and a reference time, and the contention period of said each selecting server is greater than a specified time $\Delta t$ to ensure that each of the selecting servers in the group receives the contention messages from all the other selecting servers in the group during the contention period of said each selecting server for choosing the selected server.

2. The method according to claim 1, wherein each contention message includes a time value, and the using includes using the time values in the contention messages from the servers to select the selected server.

3. The method according to claim 2, wherein each of the time values identifies an absolute time, and the using the time values includes choosing as the selected server, the server whose contention message has the earliest absolute time.

4. The method according to claim 2, wherein:
    the multitude of servers enter and leave the distributed computing system at different times; and
    the time value in the contention message from each of the servers identifies the length of time when said each server entered the distributed computing system.

5. The method according to claim 1, wherein said group of servers includes all of the servers in the distributed computing system.

6. The method according to claim 1, wherein said group of servers is less than all of the servers in the distributed computing system.

7. The method according to claim 1, further comprising:
    each of the selecting servers, at the end of the contention period of said each selecting server, sending to all of the other selecting servers a message identifying the one of the selecting servers chosen by said each selecting server as the selected server.

8. A server selection system for selecting a selected server for performing a specified function in a distributed computing system, the server selection system comprising one or more processing units configured for:

identifying a group of servers used in the distributed computing system as selecting servers for choosing the selected server;

each of the selecting servers going through a respective contention period during which said each selecting server contends to be the selected server, including each selecting server sending, during the contention period of said each server, a contention message including a time stamp to all the other selecting servers;

each of the selecting servers receiving the contention messages from all of the other selecting servers;

the selecting servers using the time stamps of the contention messages to choose the selected server;

each of the selecting servers periodically re-sending the contention message of the selected server; and the selected server querying other servers in the distributed computing system for specified contents and transferring state only from other servers that present differences; and wherein each of the selecting servers in the group has a respective clock for keeping time; and for each of the selecting servers, there is a difference between the clock of said each selecting server and a reference time, and the contention period of said each selecting server is greater than a specified time $\Delta t$ to ensure that each of the selecting servers in the group receives the contention messages from all the other selecting servers in the group during the contention period of said each selecting server for choosing the selected server.

9. The server selection system according to claim 8, wherein each contention message includes a time value, and the using includes using the time values in the contention messages from the servers to choose the selected server.

10. The server selection system according to claim 9, wherein each of the time values identifies an absolute time, and the using the time values includes choosing as the selected server, the server whose contention message has the earliest absolute time.

11. An article of manufacture comprising: at least one computer usable device having computer readable program code logic to execute a machine instruction in a processing unit for choosing a server as a selected server for performing a specified function in a distributed computing system, the computer readable program code logic, when executing, performing the following:

identifying a group of servers used in the distributed computing system as selecting servers for choosing the selected server;

each of the selecting servers going through a respective contention period during which said each selecting server contends to be the selected server, including each selecting server sending, during the contention period of said each server, a contention message including a time stamp to all the other selecting servers;

each of the selecting servers receiving the contention messages from all of the other selecting servers;

the selecting servers using the time stamps of the contention messages to choose the selected server;

each of the selecting servers periodically re-sending the contention message of the selected server; and the selected server querying other servers in the distributed computing system for specified contents and transferring state only from other servers that present differences; and wherein each of the selecting servers in the group has a respective clock for keeping time; and for each of the selecting servers, there is a difference between the clock of said each selecting server and a reference time, and the contention period of said each selecting server is greater than a specified time $\Delta t$ to ensure that each of the selecting servers in the group receives the contention messages from all the other selecting servers in the group during the contention period of said each selecting server for choosing the selected server.

12. The article of manufacture according to claim 11, wherein each contention message includes a time value, and the using includes using the time values in the contention messages from the servers to choose the selected server.

13. The article of manufacture according to claim 12, wherein each of the time values identifies an absolute time, and the using the time values includes choosing as the selected server, the server whose contention message has the earliest absolute time.

14. A method of selecting a name server in a distributed computing system, said name server mapping names for objects in the system to machine-readable identifiers, the method comprising:

identifying a group of servers in the system as selecting servers for choosing the name server;

each of the selecting servers going through a respective contention period during which said each selecting server contends to be the selected server, including each selecting server in the group sending, during the contention period of said each server, a contention message including a time stamp to all the other selecting servers;

each of the selecting servers receiving the contention messages from all of the other selecting servers;

the selecting servers using the time stamps of the contention messages to select the name server, including choosing as the selected server for performing the specified function, the one server of the group of selecting servers that has been in the distributed computing system the longest based on the time stamps in the contention messages;

each of the selecting servers periodically re-sending the contention message of the selected server; and the selected server querying other servers in the distributed computing system for specified contents and transferring state only from other servers that present differences; and wherein each of the selecting servers in the group has a respective clock for keeping time; and for each of the selecting servers, there is a difference between the clock of said each selecting server and a reference time, and the contention period of said each selecting server for choosing the name server is greater than a specified time $\Delta t$ to ensure that each of the selecting servers in the group receives the contention messages from all of the other selecting servers in the group during the contention period of said each selecting server for choosing the name server.

15. The method according to claim 14, wherein each contention message includes a time value, and the selection includes selecting as the name server, the server whose contention message has the earliest absolute time.

\* \* \* \* \*